Jan. 25, 1966  M. H. PETERSON ETAL  3,230,903

HAY WAFERING METHOD AND APPARATUS

Filed May 14, 1962  2 Sheets-Sheet 1

INVENTORS.
MERLE H. PETERSON &
STANLEY L. LAWRENCE
BY Barnard & McGlynn
ATTORNEYS.

INVENTORS.
MERLE H. PETERSON &
STANLEY L. LAWRENCE
BY
Barnard & McGlynn
ATTORNEYS.

3,230,903
HAY WAFERING METHOD AND APPARATUS
Merle H. Peterson and Stanley L. Lawrence, Livonia, Mich., assignors to Massey-Ferguson, Inc., Detroit, Mich., a corporation of Maryland
Filed May 14, 1962, Ser. No. 194,399
17 Claims. (Cl. 107—14)

This invention relates to a method and apparatus for producing hay wafers and, in particular, to an improved method and apparatus for field wafering forage crops into hay wafers of substantially uniform quality, constituency, length, shape and density for livestock feed.

In recent times, apparatus have been devised for field wafering forage crops into hay wafers comprising means for supplying hay, preferably precondtioned or processed, finely chopped, mixed and blended hay from a window within a field, to a horizontally disposed hopper communicating with a wafering chamber at one end thereof which, in turn, communicates with the entrance ends of an annular series of axially open radially extending die cells disposed in a substantially vertical plane or, in other words, a plane perpendicular to the ground over which the apparatus traverses. A horizontal rotatively driven shaft extends through the hopper and wafering chamber substantially coaxially with the annular series of die cells, and mounts a feed auger for feeding hay from the hopper to the wafering chamber. Means including radial arms having rollers journaled on opposite ends thereof and arcuately shaped deflector means are carried on the drive shaft within the wafering chamber so as to travel in a rotative path with the drive shaft closely spaced from the entrance ends to the die cells, and so that hay received within the wafering chamber will be laid along the entrance ends to the die cells for compression or compaction into and through the latter upon successive passes of the rollers applying force thereto. As a result, as the apparatus moves through a field of mown hay, a continuous extrusion of compressed or compacted hay of substantially uniform quality, constituency, shape and density emerges from the exit ends of the respective die cells, and each extrusion is adapted to be engaged with an ejection plate adjacent the exit end of each of the die cells to break the respective extrusions of hay into hay wafers of substantially uniform length which fall upon a conveyor means for removal from the apparatus. Heat generated by the apparatus and the heat of compression have been relied upon to cure the hay extrusions as they pass through the respective die cells to insure that the hay wafers broken therefrom remain stable and do not fall apart.

In an apparatus of the type aforementioned, considerable loads, and particularly dynamic loads, are imposed on the bearings supporting the rotatively driven shaft due to its horizontal disposition and the fact that the radial arms and rollers journaled thereon are mounted at one end of the shaft for rotation in the vertical plane of the annular series of die cells. Furthermore, due to the disposition of the annular series of die cells in a substantially vertical plane, it will be apparent that different forces are required and generated in compressing hay through die cells arranged along an upper portion of the annular series thereof as compared to a lower portion thereof, thereby further contributing adverse and variable loadings on various of the components of the apparatus. In addition, the wafers ejected from the exit ends of the die cells located along the upper portion of the series thereof must fall a considerable distance onto the conveyor means utilized to convey the wafers from the apparatus, often resulting in chipping or breaking of such wafers. Also, the heat developed by the apparatus and generated during compression of the hay through the die cells is often insufficient to cure the extrusions of hay therein adequately, thereby making it necessary to conduct extraneous heat from the engine of the apparatus to the die cells for curing purposes.

Thus, the present invention contemplates an improved method and apparatus of the general type aforementioned for making compressed hay wafers, and characterized by the fact that an annular series of die cells are mounted in a substantially horizontal plane on a supporting frame with a drive shaft for a feed auger and compression rollers arranged substantially coaxially with the annular arrangement of the die cells and extending vertically upwardly therefrom for connection of the opposite end thereof to an engine or power plant supported on the frame. As a result, it is not only possible to relatively substantially balance the wafering apparatus, both statically and dynamically, to substantially eliminate the extreme and variable loadings occasioned in the prior art apparatus, but also the wafers broken from the extrusions emerging from the respective die cells are contained in the same generally horizontal plane, whereby they all fall a relatively short and equal distance to a suitable conveyor means for conveying them from the apparatus.

Further in accordance with the present invention, an annular series of axially open radially extending curing cells are disposed in the horizontal plane of the die cells, and each such curing cell includes an entrance end communicating with the exit end of an associated die cell and an exit end terminating immediately adjacent and above an annular conveyor belt including one or more annularly spaced break-off tabs upstanding therefrom into the horizontal plane of the die and curing cells. As a result, the compressed partially cured hay extruded from the exit ends of the respective die cells pass into the curing cells for further curing enhancing their stability and, upon the cured extrusions emerging from the exit ends of the respective curing cells, the aforementioned break-off tab or tabs are engageable therewith to break the extrusion into wafers of substantially uniform length and also to convey such wafers away from the apparatus.

In order to facilitate an understanding of the invention, a preferred embodiment thereof will now be described with reference to the accompanying drawings in which.

Figure 1:
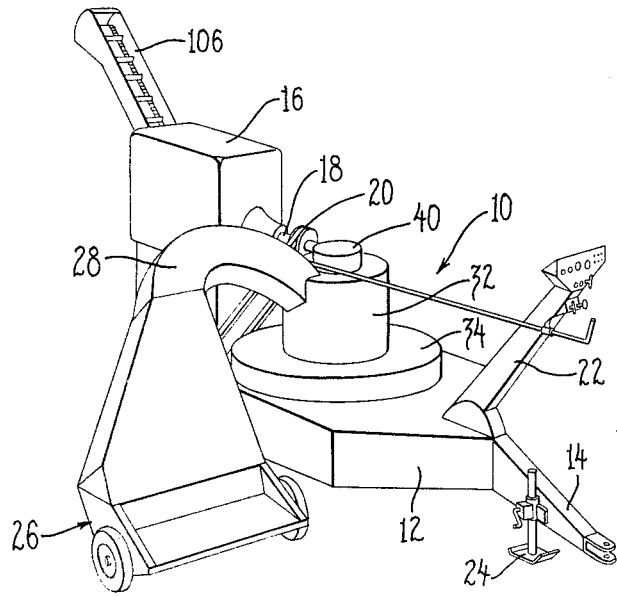
FIGURE 1 is a perspective view of a hay wafering apparatus embodying the invention.

Referring now to the drawings, the numeral 10 in FIGURE 1 generally indicates a hay wafering apparatus comprising a frame 12 equipped with ground engaging wheel means in the usual manner and a drawbar 14 adapted to be hitched to a suitable prime mover, such as an agricultural tractor, for drawing the frame along a field of mown hay. A suitable engine 16 is mounted on the frame and includes an output shaft 18 mounting a suitable number of pulley members 20 entraining belts to drive various of the instrumentalities of the apparatus. A control pedestal 22 is provided on the frame and mounts at the upper end thereof a control panel for controlling the engine 16 and other instrumentalities of the apparatus. An adjustable foot 24 is provided as usual on the drawbar 14 to support the latter when the apparatus is not hitched to a towing prime mover.

The apparatus aforedescribed is adapted to be towed along a field of mowed or cut hay, preferably with the hay arranged in windrows and having been preconditioned or processed in a known manner so as to consist of finely chopped, mixed and blended stem and leave components forming a substantially homogeneous mass. As the apparatus is towed along the field, the hay in a given windrow is adapted to be picked up in a wheeled rotary flail type mechanism indicated generally at 26 and of a known type comprising a plurality rapidly rotating flails directing the homogenized hay in an air stream into the delivery chute 28 which delivers the hay through an opening 30 in the upper end of a vertically disposed enclosed cylindrical hopper 32. The lower end of hopper 32 is encased within an annular housing 34 suitably supported on frame 12.

Figure 2:
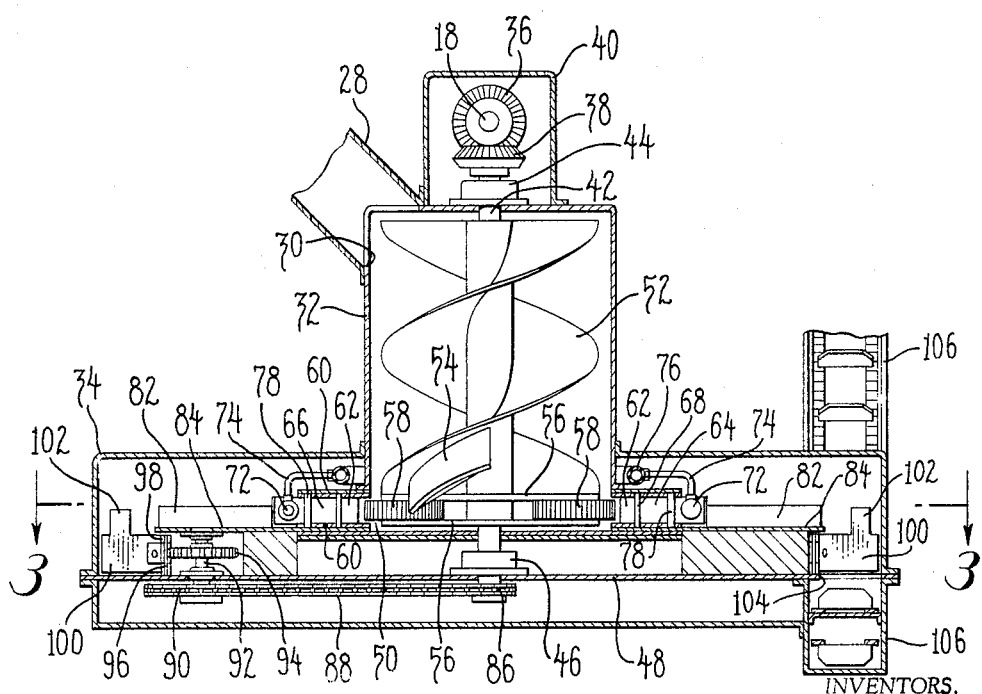
FIGURE 2 is an enlarged fragmentary vertical section through the apparatus of FIGURE 1 illustrating certain details thereof.
Figure 3:
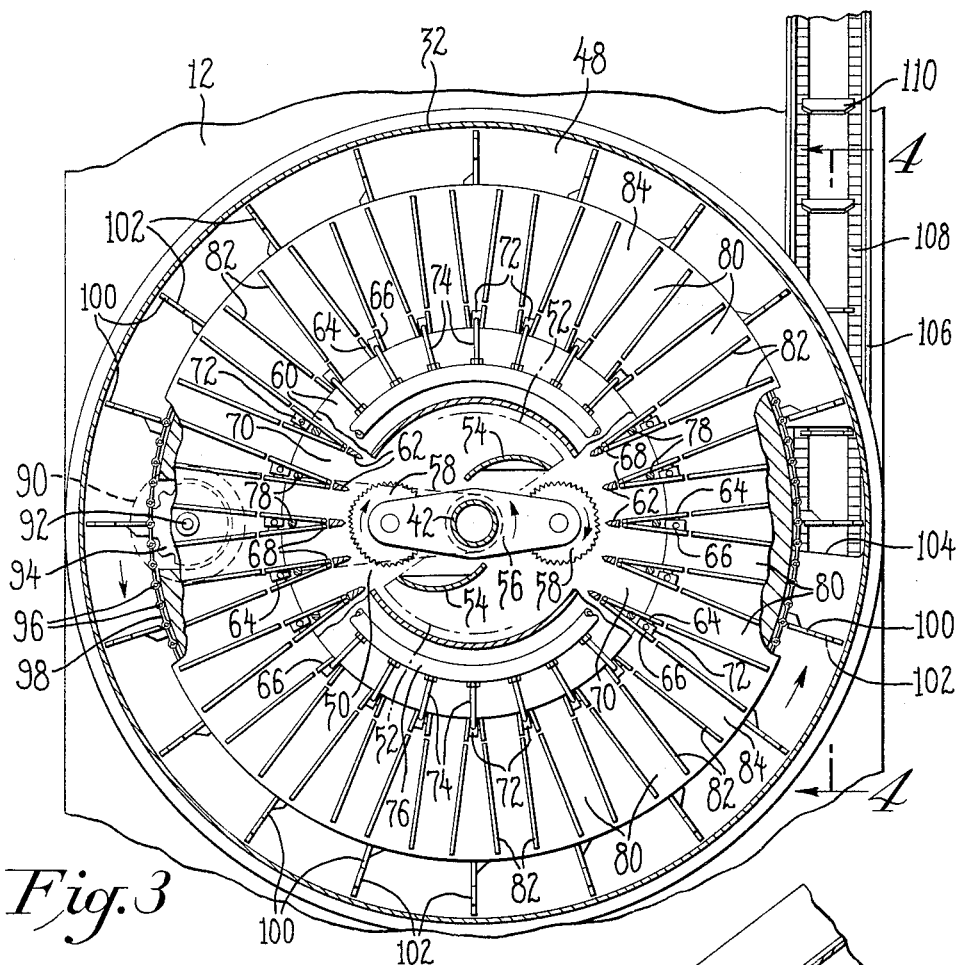
FIGURE 3 is a fragmentary sectional view, partly broken away to illustrate certain details of the construction, taken on line 3—3 of FIGURE 2.
Figure 4:
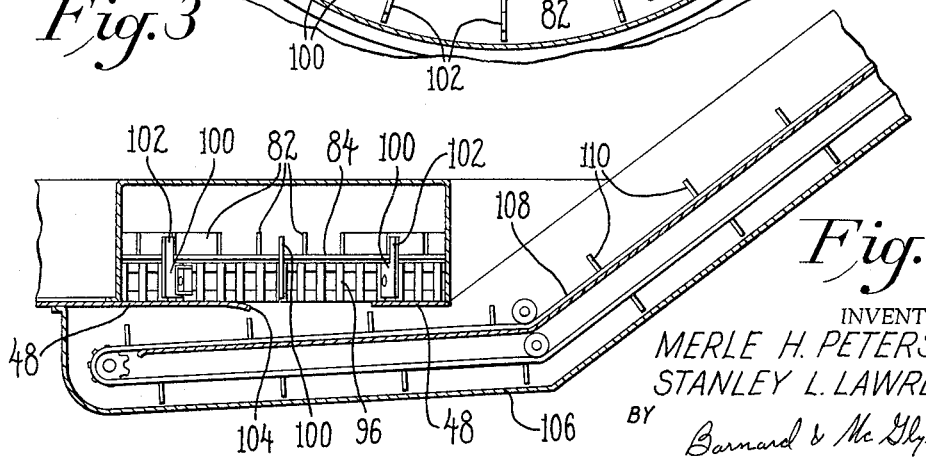
FIGURE 4 is a fragmentary sectional view taken on line 4—4 of FIGURE 3.

A bevel gear 36 is secured at the end of the engine output shaft 18 and engages with a similar bevel gear 38 within a housing 40 above the hopper 32. The bevel gear 38 is secured to the upper end of a vertical drive shaft 42 rotatably supported in suitable bearing means 44 within the housing 40 and bearing means 46 mounted on a panel or floor member 48 secured within the annular housing 34. As appears particularly in FIGURE 2, the drive shaft 42 extends through the hopper 32 and a wafering chamber 50 therebelow within the annular housing 34. A multiple flight feed auger 52 is secured on the drive shaft 42 within hopper 32 so as to be radially inwardly spaced from the cylindrical side wall thereof, while a pair of arcuate deflector vanes 54 project from the lower end of the auger into the wafering chamber 50. Horizontal radially extending arms 56 have their central portions suitably rigidly secured to the drive shaft 42 for rotation therewith within the wafering chamber 50, and have journaled at the opposite ends thereof a pair of rollers 58 the peripheries of which may be serrated as indicated in FIGURE 3. The deflector vanes 54 are disposed in advance of the path of rotation of the arms 56 and the rollers 58 for a purpose to appear hereinafter.

The wafering chamber 50 includes vertically spaced parallel annular wall members 60 having fixedly disposed therebetween an annular or circumferentially spaced series of knife edges 62. An annular or circumferentially spaced series of pairs of side wall members 64 and 66 are disposed between the wall members 60, and have their radially inner ends suitably hingedly connected as indicated at 68 adjacent a respective fixed knife edge 62 to form an annular or circumferentially spaced series of axially open die cells 70 between wall members 60 and the respective oppositely spaced side wall members 64 and 66 of an adjacent pair thereof. As will be apparent, the axes of the respective die cells are contained in a common horizontal plane or a plane parallel with the ground, and the entrance ends thereof communicate with wafering chamber 50. Furthermore, the cross sections of the respective die cells 70 converge radially outwardly from the hinge points 68 toward the exit ends thereof due to the fact that the respective oppositely disposed side wall members forming a part of each die cell converge in this manner. In addition, an hydraulically operated motor assembly 72 of the type comprising relatively reciprocable piston and cylinder elements is interposed between each hinged pair of side wall members 64 and 66 to control their angular relationship about their hinge point 68 and, hence, the extent to which the cross section of each die cell converges toward its exit end. Each of the motor assemblies is connected through a conduit 74 to a common annular manifold 76 connected to a source of fluid under pressure controlled from the control panel on control pedestal 22. As a result, fluid under substantially equal pressure is supplied from manifold 76 to each of the motor assemblies 72 to vary the angular relationship between the respective pairs of side wall members 64 and 66 and the converging cross sections of the respective die cells to a substantially equal extent. A pin 78 may be interposed between each pair of hinged side wall members 64 and 66 to limit their angular movement toward each other to insure that the cross sections of the respective die cells always converge to some extent throughout their lengths from the entrance ends to the exit ends thereof.

As will be readily apparent particularly from FIGURE 3, the rollers 58 are positioned as to be closely spaced to but not engage the knife edges 62 and the entrance ends to the respective die cells 70. Thus, hay fed continuously by the auger 52 from the hopper 32 into the wafering chamber 50 is laid across the knife edges 62 and the entrance ends of the respective die cells by the deflector vanes 54 in advance of the rotative path of the rollers 58 which compress the hay, force it past the knife edges and compact it into and through the respective die cells upon successive rotative passes thereof.

As the hay is compressed and compacted into and through the die cells, extrusions of hay of substantially uniform quality, constituency, shape and density are formed which emerge from the exit ends of the die cells into the entrance ends of an annular or circumferentially spaced series of axially open curing cells 80 of substantially uniform cross section throughout their lengths, and comprising oppositely spaced parallel side wall members 82 disposed on an annular floor member 84 within annular housing 34. Thus, the axes of the curing cells 80 are contained substantially in the horizontal plane of the die cells 70, and the cross sections of the respective curing cells and particularly the distance between the side wall members 82 thereof is at least as great as the maximum cross section obtainable at the exit ends of the die cells by adjustment of the angular positions of the side wall members thereof under the influence of motor assemblies 72. Thus, the extrusions of compacted hay emerging from the exit ends of the die cells 70 pass into the respective curing cells 80 for further curing and to provide additional stability within the extrusion for subsequent handling.

A drive sprocket 86 is secured to the lower end of the drive shaft 42 beneath floor member 48 within annular housing 34, and is connected through the drive chain 88 to a sprocket 90 mounted on a vertical shaft 92 suitably rotatably mounted between floor members 48 and 84. Gear wheel 94 secured on shaft 92 engages an annular or circumferential series of drive pins 96 of an annular conveyor belt mechanism 98 including the radially outwardly projecting annularly or circumferentially spaced conveyor paddles 100. It will be noted that the conveyor paddles 100 travel in a continuous path about the exit ends of the curing cells 80 and are disposed immediately below the floor member 84 and the horizontal plane thereof and of the die cells 70. A plurality of spaced break-off tabs 102 each upstand from a respective one of the conveyor paddles 100 and project into the horizontal plane of the curing cells 80 so as to be engageable with a radially outer portion of a given extrusion of hay emerging therefrom above the floor member 48. As a break-off tab 102 so engages an extrusion of compacted hay, the latter is caused to bend and break substantially at the exit end of its associated curing cell to form a wafer which then drops onto the floor member 48 and is conveyed therealong by the associated conveyor paddle. As will be appreciated, the gear reduction between the drive shaft 42 and the conveyor mechanism aforedescribed and hence the timing of the latter is such as to permit a predetermined amount of curing within the curing cells and a predetermined length of extruded hay to overhang from the exit ends of the curing cells before being engaged by a break-off tab 102. As a result, the wafers broken from the extrusions emerging from the respective curing cells are of substantially uniform quality, constituency, shape and density due to the coordinated action of the die cells 70, and of substantially uniform length.

The hay wafers which fall upon the floor member 48 are moved therealong as aforedescribed until reaching an opening 104 therein directly above an elevator type conveyor 106 including belt means 108 equipped with spaced conveyor paddles 110 which pick up the hay wafers and convey them from the apparatus preferably into a trailing conveyance. The elevator type conveyor may, of course, be self-propelled or driven through a suitable power take-off from the engine 16.

From the foregoing description, it will now be apparent that the homogenized mixture of hay including chopped, finely blended and mixed stems and leaves is delivered through the chute 28 to the hopper 32 and fed therefrom into the wafering chamber 50 by the feeding and centrifugal action of the auger 52. The deflector vanes 54 lay such hay along the entrance ends of the respective die cells 70 and the rollers 58 following the vanes compress the collection of hay into and through the die cells to form a compacted, dense extrusion which, upon successive applications of force by the rollers 58, is forced into the curing cells 80 for subsequent curing. Thereafter, due to continued rotation of the arm 56 and compression and compaction of further hay into and through the die cells 70, such extrusions are forced from the curing cells over the conveying mechanism and wafers broken therefrom by engagement with the break-off tabs 102. The wafers are then conveyed to the opening 104 in the floor member 48 and dropped into the elevator type conveyor 106 for disposal as desired.

The embodiments of the invention in which an exclusive property or privilege is claimed are defined as follows:

1. A method of wafering hay comprising the steps of laying hay upon the entrance end of an axially open die cell adjustably convergent in cross section toward an exit end thereof, applying force to the hay opposite the entrance end of the die cell to compact the hay into and through the die cell to form an extrusion of compacted hay emerging from the exit end thereof, delivering said extrusion into a curing cell of substantially uniform cross section to cure said extrusion, and breaking the cured extrusion into wafers.

2. A method of wafering hay comprising the steps of laying hay upon the entrance end of an axially open die cell adjustably convergent in cross section toward an exit end thereof, applying force to the hay opposite the entrance end of the die cell to compact the hay into and through the die cell to form an extrusion of compacted hay emerging from the exit end thereof, delivering said extrusion into the entrance end of and through an axially open curing cell of substantially uniform cross section to cure said extrusion, and breaking the extrusion emerging from the exit end of the curing cell into wafers.

3. A method of wafering hay comprising the steps of laying hay about the entrance end of an axially open die cell adjustably convergent in cross section toward an exit end thereof, applying force to the hay opposite the entrance end of the die cell to compact the hay into and through the die cell to form an extrusion of compacted hay emerging from the exit end thereof, delivering said extrusion upon continued application of force into the entrance end of and through an axially open curing cell of substantially uniform cross section to cure said extrusion, and breaking the extrusion emerging from the exit end of the curing cell into wafers of substantially uniform length.

4. A method of wafering hay comprising the steps of laying chopped and blended hay about the entrance ends of an annular series of axially open die cells each being adjustably convergent in cross section to an exit end opposite its entrance end, applying force successively to the hay opposite the entrance ends of the die cells to compact the hay into and through the die cells to form an extrusion of compacted hay emerging from the exit ends thereof, delivering said respective extrusions upon continued successive applications of force into the entrance ends of respective ones of an annular series of axially open curing cells of substantially uniform cross section to cure said extrusions and breaking the extrusions emerging from the exit ends of the curing cells into wafers of substantially uniform length.

5. In an apparatus for making compressed hay wafers, said apparatus being of the type having an annular series of axially open radially extending die cells arranged about a hay compressing means for compressing hay into and through said die cells to form wafers, each of said die cells having an entrance end communicating with said hay compressing means and an exit spaced therefrom, each of said die cells being adjustably convergent in cross section between said entrance and exit ends thereof; the improvement comprising means defining an annular series of axially open radially extending curing cells of substantially uniform cross section, each of said curing cells having an entrance end communicating with the exit end of a respective one of said die cells and an exit end spaced therefrom, whereby compressed hay emerging from said respective die cells passes through said curing cells to form the hay into cured wafers.

6. The apparatus according to claim 5 futher comprising means movable in a continuous path opposite the exit ends of said curing cells for engagement with and breaking the compressed hay emerging therefrom into wafers of predetermined length.

7. The apparatus according to claim 5 further comprising conveyor means including means movable in a continuous path opposite the exit ends of said curing cells for engagement with and breaking the compressed hay emerging therefrom into wafers of predetermined length and conveying same from said curing cells.

8. The apparatus according to claim 5 wherein said die cells each include movable wall means to vary the convergent cross section of said die cells, the entrance end of each of said curing cells being at least as large as the largest cross section of the exit end of its associated die cell.

9. A method of wafering hay comprising the steps of applying force to hay opposite the entrance end of a die cell which is adjustably convergent in cross section between such entrance end and an exit end thereof to compact the hay into and therethrough to form an extrusion of compacted hay emerging from the exit end thereof, directing the emerging extrusion into a curing cell of substantially uniform cross section to cure such extrusion, and breaking the cured extrusion into wafers.

10. A method of wafering hay comprising the steps of applying force to hay opposite the entrance end of an axially open die cell which is adjustably convergent in cross section between such entrance end and an exit end thereof to compact the hay into and therethrough to form an extrusion of compacted hay emerging from the exit end thereof, delivering the extrusion upon continued application of force into the entrance end and through an axially open curing cell of substantially uniform cross section to cure the extrusion, and breaking the cured extrusion emerging from the exit end of the curing cell into wafers.

11. A method of wafering hay comprising the steps of applying force successively to hay opposite the entrance ends of a series of axially open die cells which are adjustably convergent in cross section between such entrance ends and exit ends thereof to compact hay into and therethrough to form extrusions of hay emerging from the exit ends thereof, delivering the extrusions upon continued successive applications of force into the entrance ends of respective ones of a series of axially open curing cells of substantially uniform cross section to cure the extrusions, and breaking the extrusions emerging from the exit ends of the curing cells into wafers.

12. In an apparatus for making compressed hay wafers, and of the type including a die cell having an entrance end communicating with hay compression means for compressing hay into and through said die cell to form an extrusion of compacted hay emerging from the exit end thereof, said die cell being adjustably convergent in cross section between said entrance and exit ends thereof; the improvement comprising means defining a curing cell having an entrance end communicating with the exit end of said die cell and an exit end spaced therefrom, said curing cell being substantially uniform in cross section between said entrance and exit ends thereof, whereby continuing compression of hay into and through said die cell forces said extrusion into and through said curing cell to cure said extrusion, and means for breaking the cured extrusion emerging from the exit end of said curing cell into wafers.

13. In an apparatus for making compressed hay wafers, and of the type including a series of axially open die cells each having an entrance end communicating with hay compression means for continuously successively compressing hay into and through said respective die cells to form extrusions of hay emerging from exit ends thereof, said die cells being adjustably convergent in cross section between said entrance and exit ends thereof; the improvement comprising means defining a series of axially open curing cells each having an entrance end communicating with the exit end of a respective one of said die cells and an exit end spaced axially therefrom, said curing cells being substantially uniform in cross section between said entrance and exit ends thereof, whereby continuing compression of hay into said die cells forces said extrusions into and through said respective curing cells to cure said extrusions.

14. In an apparatus for making compressed hay wafers, and of the type including a series of axially open die cells each having an entrance end communicating with hay compression means for continuously successively compressing hay into and through said respective die cells to form extrusions of hay emerging from exit ends thereof, said die cells being adjustably convergent in cross section between said entrance and exit ends thereof; the improvement comprising means defining a series of axially open curing cells each having an entrance end communicating with the exit end of a respective one of said die cells and an exit end spaced axially theerfrom, said curing cells being substantially uniform in cross section between said entrance and exit ends thereof, whereby continuing compression of hay into the entrance ends of said die cells forces said hay extrusions into and through said respective curing cells to cure said extrusions, and means adjacent the exit ends of said curing cells for breaking the extrusions of hay emerging therefrom into wafers.

15. The apparatus according to claim 14 wherein said last-named means comprises means movable in a continuous path opposite the exit ends of said curing cells for engagement with and breaking the extrusions emerging therefrom.

16. In an apparatus for making compressed hay wafers, said apparatus being of the type having an annular series of axially open radially extending die cells arranged about a hay compression means including a rotatable drive shaft for compressing hay into and through said die cells to form wafers, each of said die cells having an entrance end communicating with said hay compressing means and an exit end spaced therefrom and being adjustably convergent in cross section between said entrance and exit ends thereof; the improvement comprising means mounting said series of die cells in a substantially horizontal plane with said drive shaft extending vertically upwardly therefrom, and means defining an annular series of axially open radially extending curing cells disposed substantially in said horizontal plane and each having an entrance end communicating with the exit end of a respective one of said die cells and an exit end axially spaced therefrom, said curing cells being substantially uniform in cross section between said entrance and exit ends thereof, whereby the hay compressed within said die cells passes into and through said respective curing cells to cure the wafers.

17. The apparatus according to claim 16 in which said die cells each include movable wall means to vary the convergent cross section thereof, the cross section of the entrance end of each of said curing cells being at least as large as the largest cross section of the exit end of its associated die cell.

References Cited by the Examiner

UNITED STATES PATENTS

| | | | |
|---|---|---|---|
| 1,647,756 | 11/1927 | Stoll et al. | 107—54 |
| 2,059,486 | 11/1936 | Payne et al. | 100 |
| 2,065,141 | 12/1936 | Meakin | 107—54 |
| 2,205,865 | 6/1940 | Schwarzkopf | 100 |
| 2,432,326 | 12/1947 | Meakin | 107—14 |
| 2,648,296 | 8/1953 | Oliver | 107—8 |
| 2,651,269 | 9/1953 | French | 100 |
| 2,764,951 | 10/1956 | Fisher | 107—14 |
| 2,845,036 | 7/1958 | Fisher | 107—14 |
| 2,952,888 | 9/1960 | Cornelius | 100 |
| 2,958,900 | 11/1960 | Meakin | 18—12 |

FOREIGN PATENTS

| | | |
|---|---|---|
| 205,253 | 1/1957 | Australia. |
| 504,019 | 6/1951 | Belgium. |
| 875,544 | 6/1942 | France. |
| 1,250,174 | 11/1960 | France. |
| 657,337 | 9/1951 | Great Britain. |
| 668,209 | 3/1952 | Great Britain. |

OTHER REFERENCES

Agricultural Engineering, S671.A3 August 1961, 56-1, pp. 412–415 and 423. (Copy in Group 410.)

Western Livestock Journal, April 1961, 100-Pelleters, pp. 36 and 39. (Copy in Group 470.)

WALTER A. SCHEEL, *Primary Examiner.*

CHARLES A. WILLMUTH, *Examiner.*